US007653944B2

(12) United States Patent
Chellapilla et al.

(10) Patent No.: US 7,653,944 B2
(45) Date of Patent: Jan. 26, 2010

(54) SEGMENTATION BASED CONTENT ALTERATION TECHNIQUES

(75) Inventors: Kumar H. Chellapilla, Sammamish, WA (US); Patrice Y. Simard, Bellevue, WA (US); Shannon A. Kallin, Redmond, WA (US); Erren Dusan Lester, Renton, WA (US); Ismail Cem Paya, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 880 days.

(21) Appl. No.: 11/046,996

(22) Filed: Jan. 31, 2005

(65) Prior Publication Data
US 2005/0246775 A1 Nov. 3, 2005

Related U.S. Application Data

(63) Continuation-in-part of application No. 10/815,086, filed on Mar. 31, 2004, now Pat. No. 7,505,946.

(51) Int. Cl.
  *G06F 7/04* (2006.01)
  *G06F 17/30* (2006.01)
  *H04N 7/16* (2006.01)
(52) U.S. Cl. .................................. 726/27; 380/202
(58) Field of Classification Search ................ 709/225, 709/206, 229; 382/100; 713/202, 182; 705/14, 705/50; 726/23, 27; 380/202
See application file for complete search history.

(56) References Cited

U.S. PATENT DOCUMENTS

| | | | |
|---|---|---|---|
| 6,195,698 B1* | 2/2001 | Lillibridge et al. | 709/225 |
| 6,289,108 B1* | 9/2001 | Rhoads | 382/100 |
| 7,139,916 B2* | 11/2006 | Billingsley et al. | 713/182 |
| 7,337,324 B2* | 2/2008 | Benaloh et al. | 713/182 |
| 2002/0101987 A1* | 8/2002 | Koc et al. | 380/44 |
| 2003/0204569 A1* | 10/2003 | Andrews et al. | 709/206 |
| 2005/0021649 A1* | 1/2005 | Goodman et al. | 709/207 |
| 2005/0066201 A1* | 3/2005 | Goodman et al. | 713/202 |
| 2005/0144067 A1* | 6/2005 | Farahat et al. | 705/14 |
| 2005/0216955 A1* | 9/2005 | Wilkins et al. | 726/23 |
| 2005/0229251 A1* | 10/2005 | Chellapilla et al. | 726/23 |
| 2005/0278253 A1* | 12/2005 | Meek et al. | 705/50 |
| 2006/0095578 A1* | 5/2006 | Paya et al. | 709/229 |

OTHER PUBLICATIONS

Dittmann, J. ; Content-based digital signature for motion pictures authenticationand content-fragile watermarking; Publication Date: Jul. 1999; INSPEC ; vol. 2, On pp. 209-213 vol. 2.*

(Continued)

*Primary Examiner*—Kambiz Zand
*Assistant Examiner*—Monjour Rahim
(74) *Attorney, Agent, or Firm*—Lee & Hayes, PLLC

(57) ABSTRACT

The subject invention provides a unique system and method that facilitates creating HIP challenges (HIPs) that can be readily segmented and solved by human users but that are too difficult for non-human users. More specifically, the system and method utilize a variety of unique alteration techniques that are segmentation-based. For example, the system and method employ thicker arcs or occlusions that do not intersect characters already placed in the HIP. The thickness of the arc can be measured or determined by the thickness of the characters in the HIP. In addition to increasing the thickness, the arcs can be lengthened because longer arcs tend to resemble pieces of characters and may be harder to erode. Usability maps can be generated and used to selectively place clutter or occlusions and to selectively warp characters or the character sequence to facilitate human recognition of the characters.

19 Claims, 8 Drawing Sheets

EXAMPLES WITH TEXTURE AND COLOR:

OTHER PUBLICATIONS

Luis Von Ahn, et al., Telling Humans and Computers Apart (Automatically) or How Lazy Cryptographers do AI, Communications of the ACM, Feb. 2004, 11 pages.

First Workshop on Human Interactive Proofs, Jan. 9-11, 2002, 5 pages, Palo Alto, California, USA.

H.S. Baird, et al., Human Interactive Proofs and Document Image Analysis, Proc. IAPR 2002, 2002, 12 pages, Workshop on Document Analysis Systems, Princeton, New Jersey, USA.

Luis Von Ahn, et al., Telling Humans and Computers Apart(Automatically), The Captcha Project, 2000, 3 pages, http://www.captcha.net.

A.M. Turing, Computing Machinery and Intelligence, Mind, 1950, pp. 433-460, vol. 59-No. 236.

Patrice Y. Simard, et al., Using Character Recognition and Segmentation to Tell Computers from Humans, ICDAR 2003, 2003, pp. 418-423.

Paypal, an eBay Company, 1999, 1 page.

Kumar Chellapilla, et al., Using Machine Learning to Break Visual Human Interaction Proofs (HIPs), Neural Information Processing Systems Conference 2005, Dec. 13-16, 2004, 8 pages, Vancouver, BC, Canada.

Patrice Y. Simard, et al., Using Character Recognition and Segmentation to Tell Computer from Humans, International Conference on Document Analysis and Recognition (ICDAR), IEEE Computer Society. 2003. pp. 418-423. Los Alamitos.

European Search Report dated Jul. 13, 2007, mailed Jul. 27, 2007, for European Patent Application Serial No. 05102061, 4 pages.

Simard, et al. "Using Character Recognition and Segmentation to tell Computers from Humans" (2003) Proceedings of the 7th International Conference of Document Analysis and Recognition, pp. 418-423.

Xu, et al. "Mandatory Human Participation: A New Authentication Scheme for Building Secure Systems" (2003) Proceedings of the 12th International Conference of Computer Communications and Networks, pp. 547-552.

Von Ahn, et al. "Telling Humans and Computers Apart Automatically" (2004) ACM Feb. vol. 47, No. 2, pp. 57-60.

* cited by examiner

EXAMPLES WITH TEXTURE AND COLOR:

WITH ARCS OF VARYING THICKNESS — 500

WITH NON-INTERSECTING THICK ARCS AND INTERSECTING THIN ARCS — 600 — 610

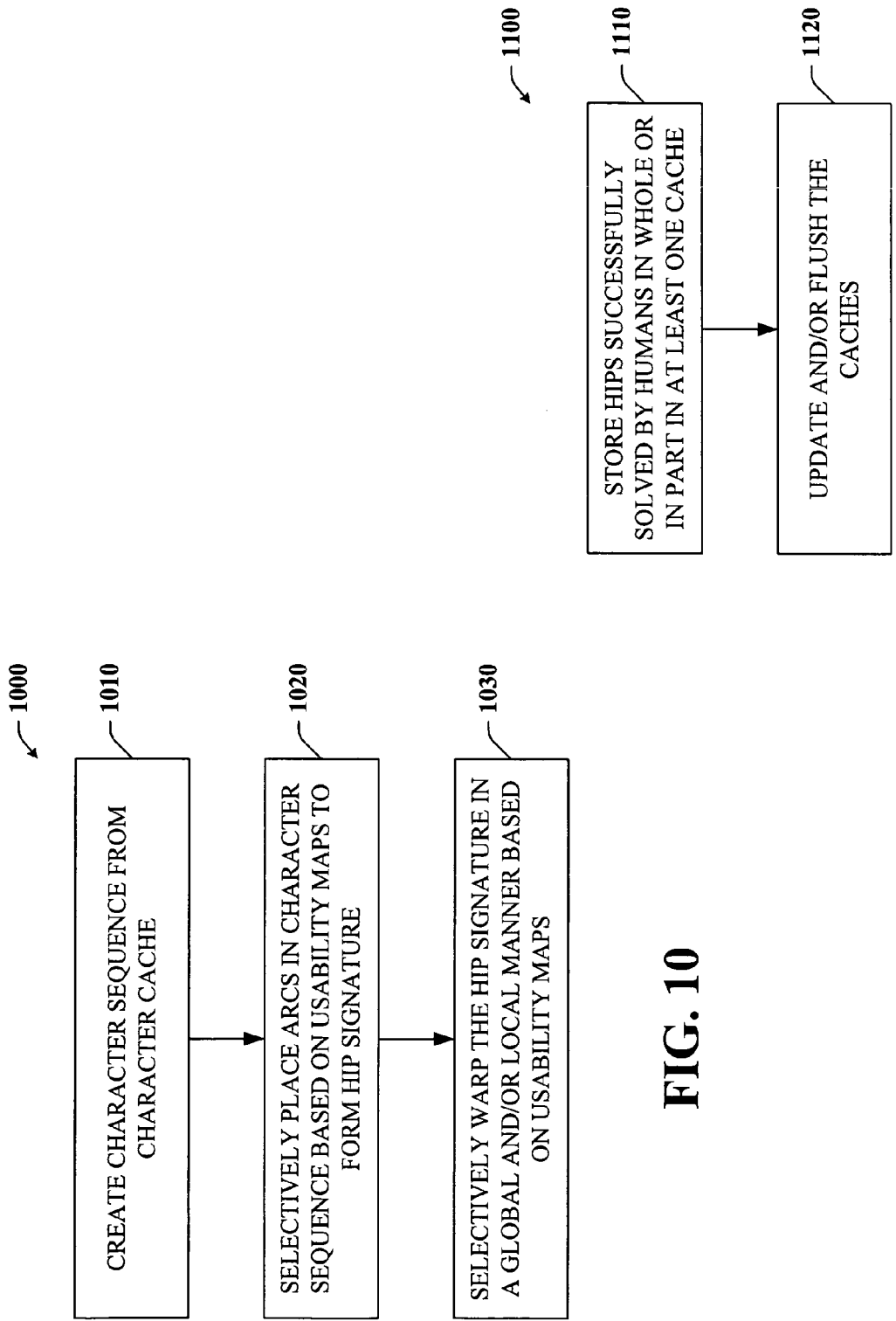

SEGMENTATION BASED CONTENT ALTERATION TECHNIQUES

CROSS REFERENCE TO RELATED APPLICATION

This application is a continuation-in part of U.S. application Ser. No. 10/815,086, entitled High Performance Content Alteration Architecture and Techniques and filed on Mar. 31, 2004, the entirety of which is incorporated herein by reference.

TECHNICAL FIELD

The subject invention relates generally to human interactive proofs and in particular, to improving the appearance of human interactive proofs to facilitate increasing their effectiveness in distinguishing computer-based action from human action.

BACKGROUND OF THE INVENTION

The advent of global communications networks such as the Internet has presented commercial opportunities for reaching vast numbers of potential customers. In the past several years, users have turned to the Internet as a reliable source of news, research resources, and various other types of information. In addition, online shopping, making dinner reservations, and buying concert and/or movie tickets are just a few of the common activities currently conducted while sitting in front of a computer by way of the Internet. However, the widespread use of the Internet by businesses as well as private consumers can lead to unwanted or even undesirable exposure to a variety of economic risks and/or security weaknesses.

With respect to online businesses, security and the validity of buyers making online purchases or reservations have become main concerns. For example, many restaurants provide an online reservation service wherein customers can make their reservations via the Internet using the restaurants' websites. Unfortunately, this system makes restaurant owners somewhat vulnerable to dinner service attacks—which are but one type of automated script attack. Such attacks occur when a computer makes several hundred, if not more, fake online reservations affecting a large number of restaurants. As a result of such an attack, these businesses can be interrupted or even damaged due to loss revenues, system repairs and clean-up costs, as well as the expenses associated with improving network security.

Another type of attack can be in the form of a spam attack. Spam attacks can be made to target one entity such as a particular business or thousands of users randomly selected according to their email addresses. In general, spam has become a fast-growing problem due to the rising popularity of email usage. As is well known, electronic messaging is becoming increasingly pervasive as a means for disseminating unwanted advertisements and promotions (e.g., spam) to network users. Widespread spam dissemination to hundreds or thousands of users or even to a single entity at a time can be attributed to the use of automated actions taken by computers. For example, spammers can program computers to create or open dozens and dozens of different email accounts from legitimate message service providers such as on a daily or weekly basis. By doing this, they can ensure that their spam is delivered to as many recipients as possible, even if one or two accounts are shut down from time to time.

The Radicati Group, Inc., a consulting and market research firm, estimates that as of August 2002, two billion junk email messages are sent each day—this number is expected to triple every two years. Individuals and entities (e.g., businesses, government agencies) are becoming increasingly inconvenienced and oftentimes offended by spam (junk messages). As such, spam is now or soon will become a major threat to trustworthy computing.

Moreover, the rapid growth and development of the Internet has introduced new avenues for fraudulent, disruptive, and/or damaging activities to occur. As a means to thwart spam and automated script attacks, some online businesses as well as messaging services have implemented the use of computational challenges or human interactive proofs (HIPs). Such techniques allow computers to distinguish human users from computer users.

Unfortunately, the current HIP systems can be faulty or problematic. For instance, some conventional HIPs can be discernible and learned by computers while others can be too difficult for humans to distinguish the characters. Hence, the conventional HIP can be rather ineffective at barring access to computers and granting access to humans.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate creating HIP challenges (HIPs) which are more effective against automated script attacks yet still easily solvable by humans. More specifically, the system and method utilize a variety of unique alteration techniques in combination with an improved architecture that optimizes human user accuracy in solving HIPs as well as the rate at which HIPs can be generated at run-time.

According to one aspect of the subject invention, the system and method employ thicker arcs or occlusions that do not intersect characters already placed in the HIP. The thickness of the arc can be measured or determined by the thickness of the characters in the HIP. When using thick, non-intersecting arcs, the precise thickness of the thick arcs can be chosen according to the thickness of the particular characters such that the thickness of the arcs and characters is relatively the same. The use of thick, non-intersecting arcs, alone or in combination with the customary thin, intersecting arcs, can increase the difficulty in segmenting the HIP into its individual character parts (e.g., identifying each character apart from the others).

According to another aspect of the invention, the length of such thick arcs can be increased as well. In particular, the length of the arcs can be adapted to improve the likelihood of generating false positives. In practice, for example, the arc length can be long enough to facilitate generating characters with longer stroke lengths. The arc length can also be chosen based on the relative dimensions of a character with respect to its bounding box. Moreover, the use of longer and thicker arcs can easily confuse machines attempting to solve the HIP because the longer, thicker arcs may more closely resemble one or more real characters. On the contrary, human users can readily locate and identify the individual characters in the HIP despite the longer and thicker arcs.

To improve run-time performance, the thick arcs as well as the longer thick arcs can be pre-rendered and cached to more quickly produce a plurality of such arcs in the HIP. The thin arcs as well as the characters can be pre-rendered and cached as well. However due to the large number of characters in different fonts and sizes and enormous variety among the intersecting (e.g., thin arcs) and non-intersecting (e.g., arcs) arcs, cache sizes can reach their upper limits and eventually cause the HIP generation process to lose efficiency. To address this concern, arcs, for instance, which are sampled from the intersecting and/or non-intersecting arc caches can be flipped (e.g., left-right or top-bottom) and/or rotated (e.g., +0, +90, +180, −90, or −180 degrees) before being rendered in the HIP. As a result, a much larger variety of arcs can be generated while consuming a smaller cache size.

According to yet another aspect of the invention, arc placement in the HIP—and among the characters already present in the HIP—can be accomplished using at least two different approaches. One approach involves a rejection-based test to determine whether a randomly selected thick arc placed at a random location in the HIP. If the arc intersects with any portion of a character, then the arc can be rejected and another arc can be randomly sampled from the cache. Intersection with a character can be ascertained by examining the thick arc pixels and the foreground pixels already present in the HIP. If no intersection occurs, then the arc is rendered. This rejection approach can be quite effective and efficient particularly when rendering a few arcs on HIPs with a relative abundance of white space. At higher arc densities, several re-samplings may be needed or a second approach can be employed.

The second approach involves selection based arc placement. In the selection-based approach, three nearby background pixels (points) can be randomly sampled from the HIP and a thick arc passing through them can be generated. The points are chosen such that two straight line segments connecting them do not contain any foreground pixels. Furthermore, the distance between these three points can be chosen such that it statistically corresponds to the desired arc length. If no intersection is determined, then the arc can be rendered. Otherwise, the arc can be rejected and the process can be repeated until an arc can be rendered or until a maximum number of attempts have been made.

To further improve run-time performance and human user success rates while minimizing automated script attacks, usability maps can be built and cached. Character regions specific to each font and character in that font can be referred to as usability maps and can be built or identified through human user studies. Usability maps can be used to control the introduced distortion and clutter density. For example, regions of a character that are deemed more important for human recognition can be subjected to lesser amounts of distortion. Regions not as important for human recognition can be subjected to greater distortions and even incur higher clutter densities.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 10 is a flow chart illustrating an exemplary high performance HIP generation in accordance with an aspect of the subject invention.

FIG. 11 is a flow chart illustrating an exemplary HIP management methodology in accordance with an aspect of the subject invention.

DETAILED DESCRIPTION OF THE INVENTION

Figure 1:
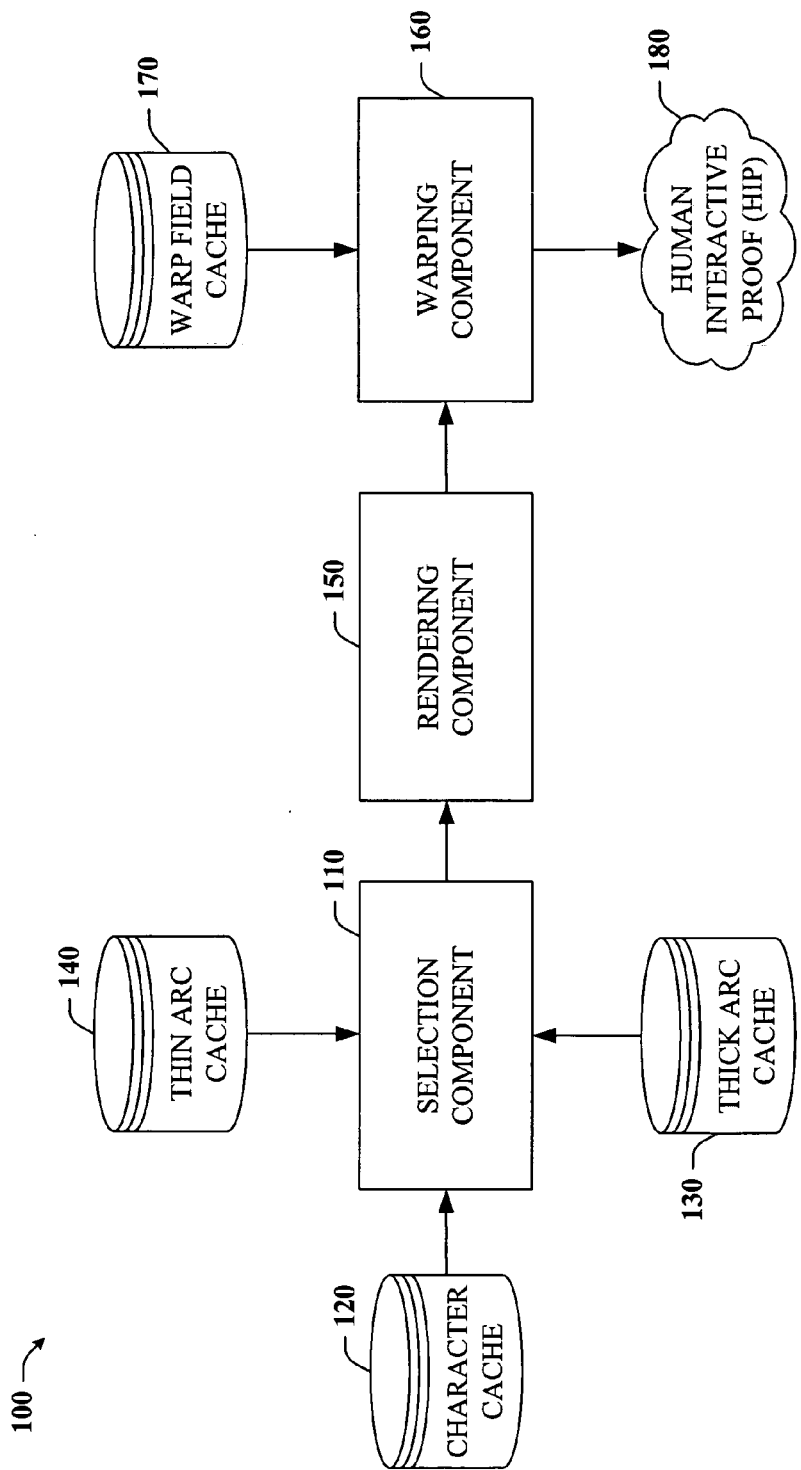
FIG. 1 is a block diagram of an improved HIP generation system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating HIP challenges or selectively sampling HIP signatures for use or re-use. A HIP signature stores the characters along with their scale and orientation as well as the locations and parameters of any thin and thick foreground arcs. Warp field parameters are typically not stored but in some instances, they can be when desired by the system operator or user.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Work on distinguishing computers from human users traces back to the original Turing Test which asks that a human distinguish between another human and a machine by asking questions of both. Recent interest has turned to developing systems that allow a computer to distinguish between another computer and a human to enable the construction of automatic filters to prevent automated scripts from utilizing services intended for humans. Such systems have been termed Human Interactive Proofs (HIPs). Construction of HIPs that are of practical value can be difficult because it is not sufficient to develop challenges at which humans are somewhat more successful than machines. This is because there is little cost in having an automatic attacker that fails most of the time. In practice, if one wants to block automated scripts, a challenge at which humans are 99% successful and machines are 1% successful is still not sufficient if the cost of failures and repetitions is low for a machine. Thus, to be useful, a HIP must make the cost of an automated attack high enough to discourage repeated guessing. From a relatively aggressive standpoint, a HIP can be considered successful when the cost of answering challenges with a machine is higher than the cost of soliciting humans to perform the same task.

Current HIPs, however, do not address directly an additional constraint which is that the HIPs must be as readable as possible by humans. HIPs can be made human friendly by understanding which parts of characters (in a given font) are used by humans during character recognition. Character regions that are not used by humans can tolerate much higher distortions and clutter densities. There are also distortions that affect humans and computers differently.

The subject invention addresses at least two aspects: Segmentation based HIPs are posed by (a) making the arc thickness distribution similar to that of the character stroke thickness distribution, and (b) introducing thick non-intersecting arcs that can interact with thin arcs to produce several false positives for characters in the HIP; and HIPs are made human friendly by controlling distortion and clutter density such that character regions important for human recognition are relatively well preserved while other regions can undergo significantly larger distortion and encounter much higher clutter density.

Moreover, the subject invention takes advantage of the fact that an appropriately altered image may be difficult for a computer to reliably read without applying expensive techniques but may be very easily understood by humans. By including such an image as a challenge in a web page (or a computer logon/access screen) and making the submission of the page (or login) dependent on a correct answer to the challenge, scripts can reasonably be prevented from running against web pages (logging into or accessing computers). This invention significantly improves on current HIP systems both in terms of robustness and security against computer based segmentation and OCR systems, as well as in human friendliness. Hence, because the invention facilitates mitigating such scripts from running repetitive tasks intended to be performed by humans, significant cost reduction, spam prevention, and security improvements can be realized.

Referring now to FIG. 1, there is a general block diagram of a HIP generation system 100 in accordance with an aspect of the subject invention. The system 100 includes at least one selection component 110 that can select from one or more caches in order to generate an initial HIP signature. The one or more caches can include a character cache 120, a thick arc cache 130, and a thin arc cache 140. Each cache can store pre-rendered images of their respective items to increase the rate at which HIP signatures can be created at run-time. For example, the character cache can include multiple versions of each character to accommodate for variances among x- and y-scaling as well as rotation and/or font. The cache 120 can maintain each pre-rendered character as a bitmap or in a compressed form (e.g., run-length encoding compression).

The selection component 110 can initially select multiple characters from the character cache 120 in a random manner to form a preliminary HIP sequence. The precise number of characters in the HIP sequence can vary based on system operator preferences and/or on the human process for which the HIP is being employed to protect. Once the characters are selected and rendered as desired by the system operator, a plurality of intersecting and non-intersecting occlusions such as arcs can be selected from the thin arc cache 140 and the thick arc cache 130, respectively.

The thick arc cache 130 can maintain a plurality of non-intersecting arcs having a thickness that is approximately equivalent to the thickness of selected characters already present in the preliminary HIP sequence. In particular, the range and probabilities of different arc thicknesses can be chosen to mimic the distribution of character strokes in any chosen font. The thickness of each arc is uniform and consistent throughout an entire arc but the thickness of each arc can differ depending on the thickness of the selected characters. These thick arcs can be randomly or selectively placed among the characters in the HIP sequence so that they do not intersect any part of a character (e.g., foreground pixels). The intersection of a character and an arc can be defined in two ways. An arc can be said to intersect a character if (a) any of the arc pixels enter the bounding box of the character; and (b) any of the arc pixels touch or overlap the pixels that make up the character.

In practice, testing to determine whether each arc intersects each character at the pixel level can be rather expensive and inefficient. A more efficient technique involves looking at the bounding box of each arc and each character. If the bounding boxes intersect, there is a greater likelihood that the arc and character intersect. However, if the bounding boxes do not intersect, then it can be safe to conclude that the arc and character do not intersect.

The thick arc cache can include arcs of varying rotation, curvature, and lengths. Longer thick arcs can be particularly effective over their shorter counterparts because they tend to make it harder for non-humans to segment the HIP. Thus, the length of the arcs can be adapted to improve the likelihood of generating false positives. To keep arc cache sizes at an optimized size, the arcs selected for inclusion in the HIP sequence can be flipped or rotated before they are rendered—instead of being cached in each flip or rotation variation. Thus, the cache does not need to store every flip or rotation variance for each arc since the arc can undergo such alteration at a later time.

In addition, the thick arcs can be self-avoiding, meaning that they do not intersect or overlap with each other when they are randomly placed—but unfortunately, they may intersect a character. However, as arc densities increase in a HIP sequence, the difficulty of avoiding other arcs increases. Shorter arcs are easier to add than longer arcs, but the smaller arcs can make the HIP more vulnerable to attack and reverse generation.

Each arc can be placed one at a time and accepted or rejected depending on the placement. Arcs may be rejected because they intersect with some part of a character or accepted because they do not intersect with any character. When accepted, the arc can be rendered on the HIP sequence by a rendering component 150.

Existing HIPs currently in use employ only thin arcs which are significantly and noticeably thinner than the width of each character. Characters which include serifs are typically wider at various regions of the character. Take the letter C, for example, which has been enlarged to show its detail. In this letter, as with many other characters, there is a noticeably thinner portion near the top of the letter next to the thicker serif portion. Unfortunately, HIPs using thin intersecting arcs alone can be problematic for the HIP and cause it to be more vulnerable to attacks.

One of the common attacks currently employed is dilation and erosion. When a character is eaten away, the thin sections of a character can cause the character to break up into pieces but the thicker sections can and most often do survive. The problem with thin arcs is that since they are all the same thinness, application of a local warp to make them wavy affects the thin arcs to a much lesser degree than the local warp of the characters. Thus, a dilation and erosion setting could be determined by the attackers that would cause primarily the thin arcs to disappear but allow certain pieces of the characters to remain. The characters could be grown back to determine where they were located (since the arcs have been substantially removed) and to ultimately identify them more easily. However, with the use or addition of longer and thicker arcs to a HIP image, such attacks are much less likely to be successful.

It should be appreciated that the HIP sequences contemplated in the subject invention can include both thin intersecting arcs as well as thick non-intersecting arcs (for use in the foreground of the HIP sequence). The combination of both types of arcs can make an attack even more unlikely to be successful without compromising human user accuracy rates. In addition, thick intersecting arcs can be employed in the background of the HIP sequence. When rendered, they appear in the same color as the background of the sequence. That is, if the background is blue, and the characters are black, a blue thick background arc can erode or breakup at least a portion of at least one black character as well as at least a portion of the foreground of the HIP sequence. Such arcs can be generated and randomly selected from an appropriate cache or as needed. Due to their nature, background arcs can be rendered last (e.g., after the foreground of the HIP sequence is rendered) but before warp field is applied. Other types of background clutter including arcs can be employed as well to break up portions of the foreground.

Once the full HIP signature (oriented and scaled characters and arcs) has been rendered by the rendering component 150, the HIP signature can be communicated to a warping component 160. The warping component 160 can warp the HIP signature according to a warp field randomly selected from a warp field cache 170. A global warp field and/or a local warp field can be selected from the cache 170 depending on whether it is desired to displace pixels in the HIP signature in a global and/or local manner. Recall that a global warp field affects the whole HIP image whereas a local warp field affects smaller, more discrete regions of the HIP image, depending on where it is applied. The examples below assist in visualizing the differences between these two warp types:

Global warp: M ⇒ MMMMMM

Local warp: M ⇒ MMMMMM

Following, a HIP challenge 180 can be produced. Successful HIP challenges can be cached in whole or in part in the appropriate cache. For example, whole HIP signatures can be cached in a HIP cache and re-used. Before actual use of the HIP, a new warp field can be applied to the HIP before it is presented to a user. Individual characters and arcs can be cached as well.

Figure 2:
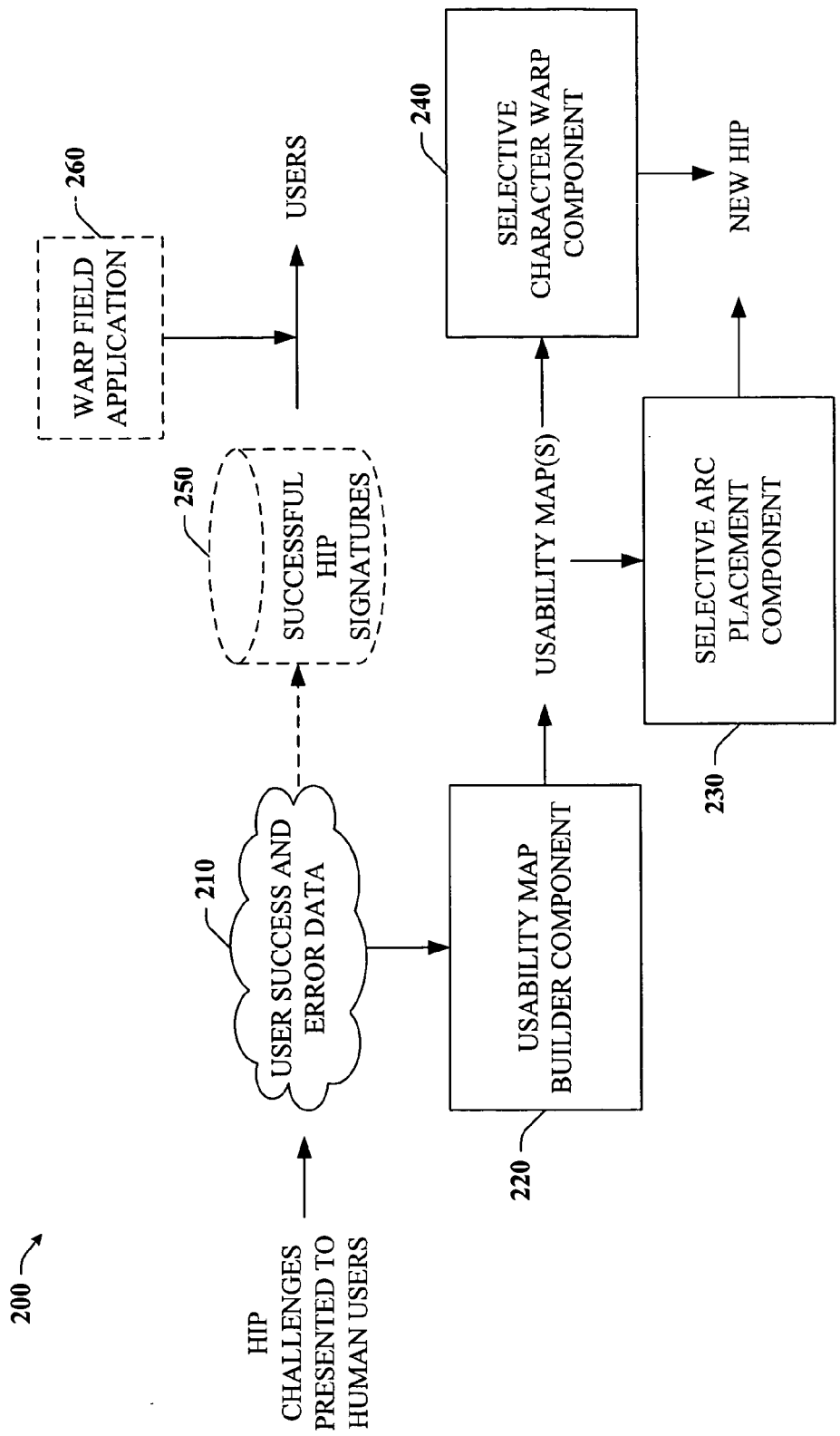
FIG. 2 is a block diagram of an improved HIP generation system in accordance with an aspect of the subject invention.

Referring now to FIG. 2, there is illustrated a block diagram of a HIP generation system 200 in accordance with another aspect of the subject invention. The system 200 builds and makes use of usability maps to facilitate the generation of more effective HIP challenges.

Usability maps can be built from a large sampling of HIP images (and/or signatures) and associated human solutions (e.g., user success and error data 210). These human solutions should contain both human successes and failures (e.g., errors). Ideally, they would be sampled from real live data or through HIP user studies, so that they reflect not only the actual errors but also their frequencies and distribution. The HIP signatures provide information about the relative location of the characters and arcs (e.g., where they intersect (if they do) and how close arc-pixels are to character-pixels). This proximity/intersection information is then combined with whether the human correctly identified the character or not (successes and errors) to obtain usability maps—via a usability map builder component 220).

Each character has a unique usability map. The size of the usability map is the same as that of the character plus possibly some extra border to account for proximity. The usability map is normalized such that probabilities for success/failure for each pixel in the character can be obtained. These probabilities satisfy:

Probability of Failure=1.0−(Probability of Success)

As a result, only one of the probabilities needs to be maintained. Success/failure probabilities or failure character regions which are robust to character/arc interaction (proximity/intersection) will have low probabilities for failure and vice versa.

Usability maps can be employed to control the distortion and clutter density introduced in any HIP. When constructed, regions that are more important and regions that are less important for human recognition of a character can be identified. Thus, regions that are more important to human recognition of a character can be subjected to smaller distortions and perhaps lesser clutter densities. Other regions not as important for human recognition of the same character are subject to larger distortions and can incur higher clutter densities.

Clutter generation requires the selection/generation of a candidate arc followed by its placement on the HIP image. When adding a new arc via a selective arc placement component 230, the existing characters and arcs are used to determine where it can be rendered. Most commonly, several locations are available for rendering a new arc. When usability maps are not being used one of the possible locations is selected uniformly at random. However, when usability maps are in use, selection is biased towards regions with a lower probability of producing errors. In this manner much higher arc densities can be accommodated without drastically increasing human errors.

As in the case with arc locations, usability maps can also be effective in determining how much local and/or global warp can be tolerated at each character pixel location. The character/arc placement/intersection usability maps can be reused for this purpose or the system operator can build usability maps that are specific to warp distortions themselves. The latter would require the collection of warp field information also in the HIP signature.

Each character can have a different usability map for the local and global warps or the same map can be reused for both. The usability map for a translated, rotated, scaled character can be obtained by appropriately translating, rotating, and scaling the usability map. The process of applying usability maps for both local and global warps is the same and is described as follows: generate a warp field for the image in a similar manner as when not using usability maps. This warp field (e.g., a pixel displacement field) is then multiplied by the warp magnitude and applied to the HIP image after all characters and arcs have been rendered. When warp usability maps are in use, the generated warp field is multiplied with the associated character usability maps (the success probabilities) in regions where the characters appear on the HIP image. The warp field is unchanged for empty HIP regions or HIP regions containing arcs. This multiplication reduces the displacement warp field values in character regions that cannot tolerate a large warp (e.g., regions with low success probabilities). This allows for significantly larger warp magnitudes to be used without affecting regions that are important for humans to decode/recognize the characters.

As an aside, successful HIP signatures which may or may not have been created using the usability maps can be stored in a successful HIP signature cache 250 and re-used again at a later time. Before any of the signatures are presented to a user, a new or different warp field can be applied by a warp field applicator 260 either globally or locally or both.

Figure 3:
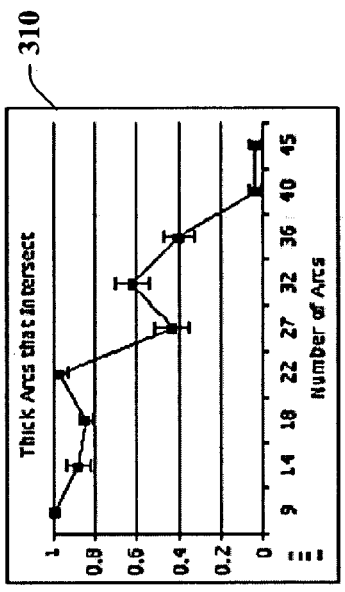
FIG. 3 is a schematic diagram of exemplary HIP challenges comprising intersecting thick arcs and human user accuracy in solving such challenges in accordance with an aspect of the subject invention.
Figure 4:
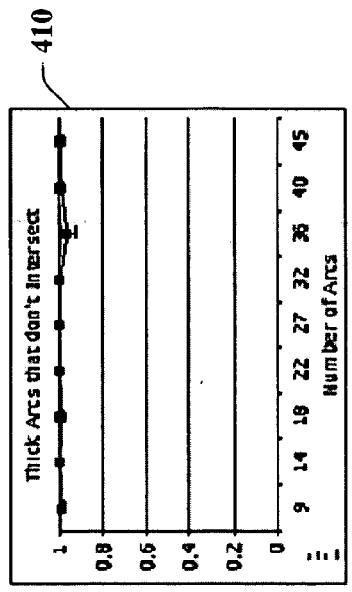
FIG. 4 is a schematic diagram of exemplary HIP challenges comprising non-intersecting thick arcs and human user accuracy in solving such challenges in accordance with an aspect of the subject invention.

Turning now to FIGS. 3 and 4, there are shown exemplary HIP challenges and their corresponding accuracy rates when presented to human users. In FIG. 3, the HIPs 300 include thick intersecting arcs. As the number of thick intersecting increases from the low 20's to the upper 20's and higher (x-axis), the rate of accuracy greatly diminishes (y-axis displays the percentages as decimals)—as shown in the graphical diagram 310.

On the contrary, FIG. 4 shows different HIP challenges 400 that include thick non-intersecting arcs and a substantial improvement in human user accuracy rates. In particular, the graphical diagram 410 indicates that the accuracy rate does not significantly vary as the density thick non-intersecting arcs increases in the HIP.

Figure 7:
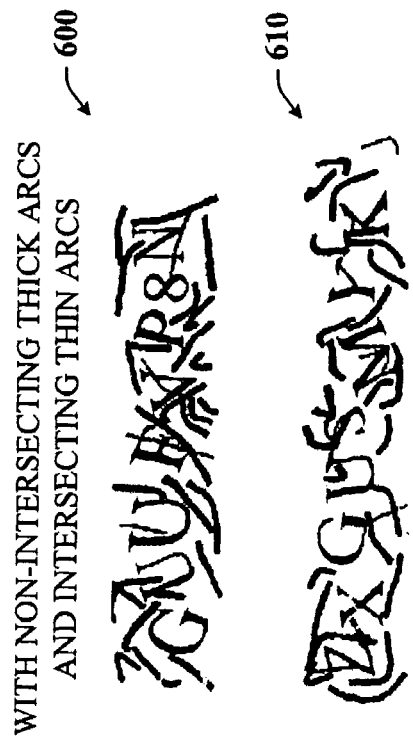
FIG. 7 illustrates exemplary HIP challenges with non-intersecting thick arcs and/or intersecting thin arcs with texture and color in accordance with an aspect of the subject invention.
Figure 5:
FIG. 5 illustrates exemplary HIP challenges with arcs of varying thickness in accordance with an aspect of the subject invention.
Figure 6:
FIG. 6 illustrates exemplary HIP challenges with non-intersecting thick arcs in accordance with an aspect of the subject invention.

Referring now to FIGS. 5-7, there are illustrated exemplary HIP challenges in accordance with many aspects of the subject invention. FIG. 5 demonstrates a HIP 500 that includes arcs of varying thickness as described hereinabove. FIG. 6 shows additional HIPs 600 and 610 that have non-intersecting thick arcs as well as intersecting thin arcs. As can be readily seen, the thick arcs more closely reflect the thickness of the characters; and the thin arcs are noticeably thinner than the thick arcs as well as the characters.

Texture and/or color can be added to the HIPs before they are fully rendered and ready for presentation to users. The HIP challenges 700 in FIG. 7 depict a few examples of such HIPs.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 8:
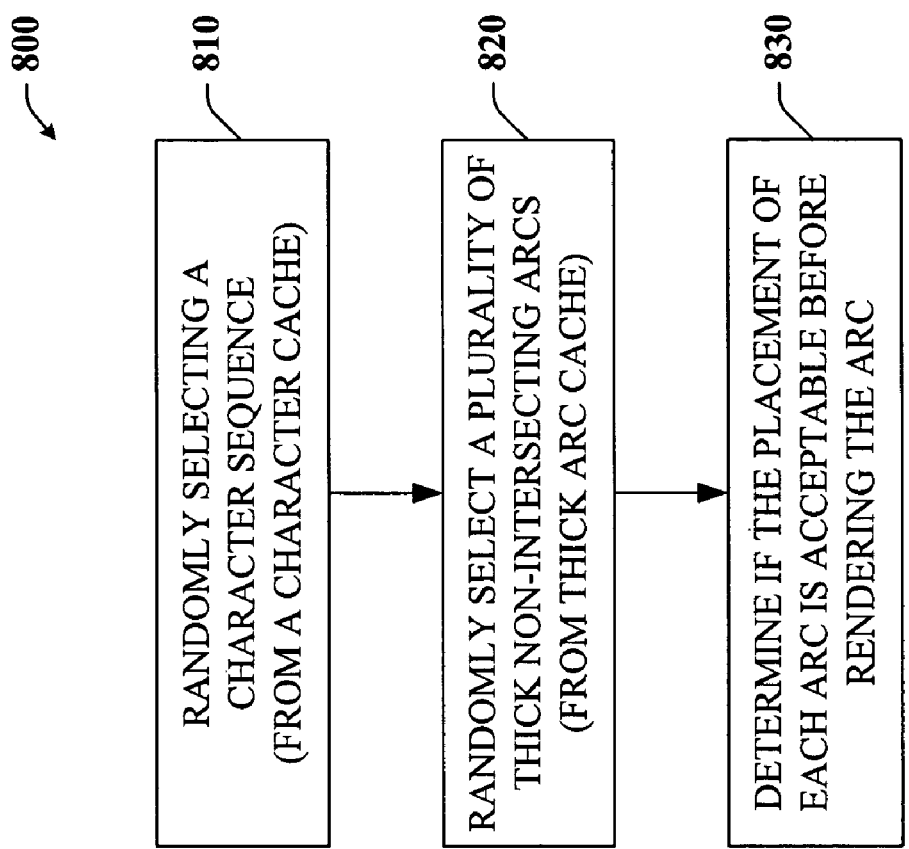
FIG. 8 is a flow chart illustrating an exemplary high performance HIP generation methodology in accordance with an aspect of the subject invention.

Referring now to FIG. 8, there is a flow diagram of a high performance HIP generation process 800 in accordance with an aspect of the subject invention. The process 800 involves randomly selecting characters from a character cache to form a character sequence at 810. At 820, a plurality of thick non-intersecting arcs of various lengths (e.g., longer and shorter arcs) can be randomly sampled one at a time and placed on the character sequence. With each arc, a determination as to whether the arc placement is acceptable (e.g., non-intersecting any foreground pixels already present or bounding boxes of the character and arc do not intersect) can be made before the arc is accepted and rendered. Otherwise, the arc can be rejected and another arc can be sampled from the cache. Arc selection continues until a desired arc density is reached throughout the character sequence. The sequence can then undergo further processing such as warp field application and/or texture and color alteration before a complete HIP is generated.

Figure 9:
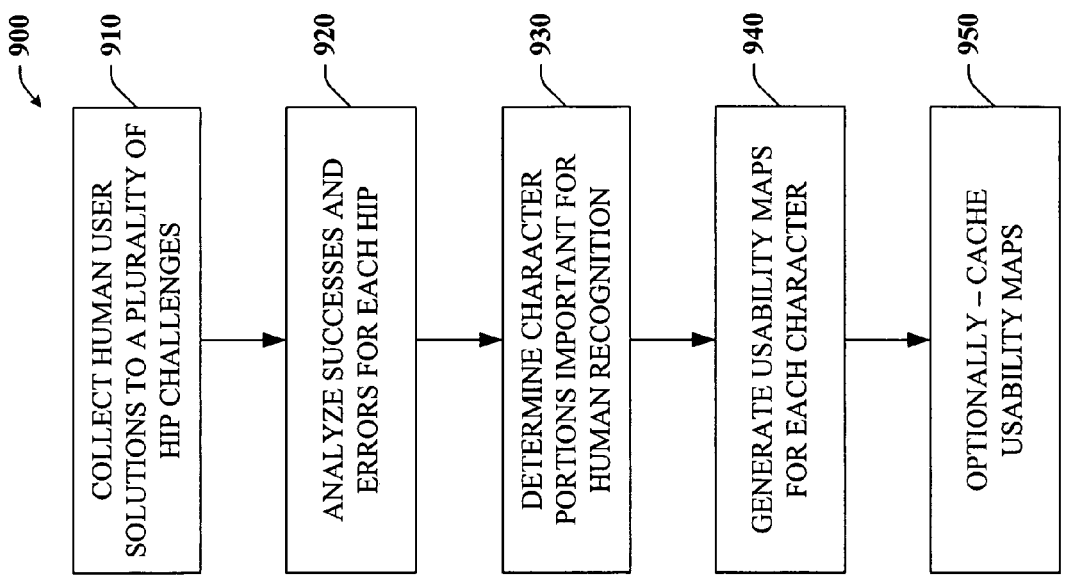
FIG. 9 is a flow chart illustrating an exemplary high performance HIP generation in accordance with an aspect of the subject invention.

Referring now to FIG. 9, there is a flow diagram of an exemplary HIP generation method 900 that makes use of human user data to facilitate generating improved high performance HIP challenges. The method 900 involves collecting human user solutions to a plurality of HIP challenges at 910. At 920, the successes and errors of each HIP can be analyzed to determine which portions of each character are more important than others for human recognition at 930. At 940, usability maps for each character can be generated that indicate areas of sensitivity to distortion and/or clutter density that would hinder or prevent successful identification of the character—by a human. Optionally, at 950, the usability maps can be cached for each character and used to guide the placement of occlusions and the degree or location of warping when generating new HIP challenges.

It should be appreciated that each character can have one or more usability maps associated therewith. For example, a usability map can be generated for each of the following: arc placement, local warp magnitude, global warp magnitude, and the like. When characters can be rendered at different scales and rotations, the corresponding usability maps for these rotated and scaled characters can be obtained by appropriately scaling and rotating the character's usability map. The character cache can provide great performance gains as the scaling and rotation of character bitmaps can be avoided at run time. Similarly performance gains can be obtained by pre-computing and caching the rotated and scaled usability maps for each character into a usability map cache.

Turning to FIG. 10, there is a flow diagram of a high performance HIP generation method 1000 that makes use of usability maps such as those created by the method 900, supra. The method 1000 involves creating a character sequence by randomly selecting multiple characters from a character cache at 1010. At 1020, arcs (e.g., thick and thin arcs) can be selectively placed in the character sequence based at least in part on the particular usability map for the particular character to form a HIP signature (e.g., characters+ occlusions). Each arc can be placed individually and either accepted or rejected. At 1030, the HIP signature can be selectively warped either globally or locally or both based at least in part on the usability maps. The usability maps may be the same or different for the global and local warp fields.

As shown in the HIP management method 1100 of FIG. 11, HIPs that have been solved successfully by humans can be stored in at least one cache and their component parts can be stored separately as well at 1110. For example, the individual characters can be cached to a character cache. At 1120, the separate caches can be updated and/or flushed periodically or as desired by the system operator to continually keep the HIPs current and variable to mitigate non-human users from learning to solve any particular HIP.

Figure 12:
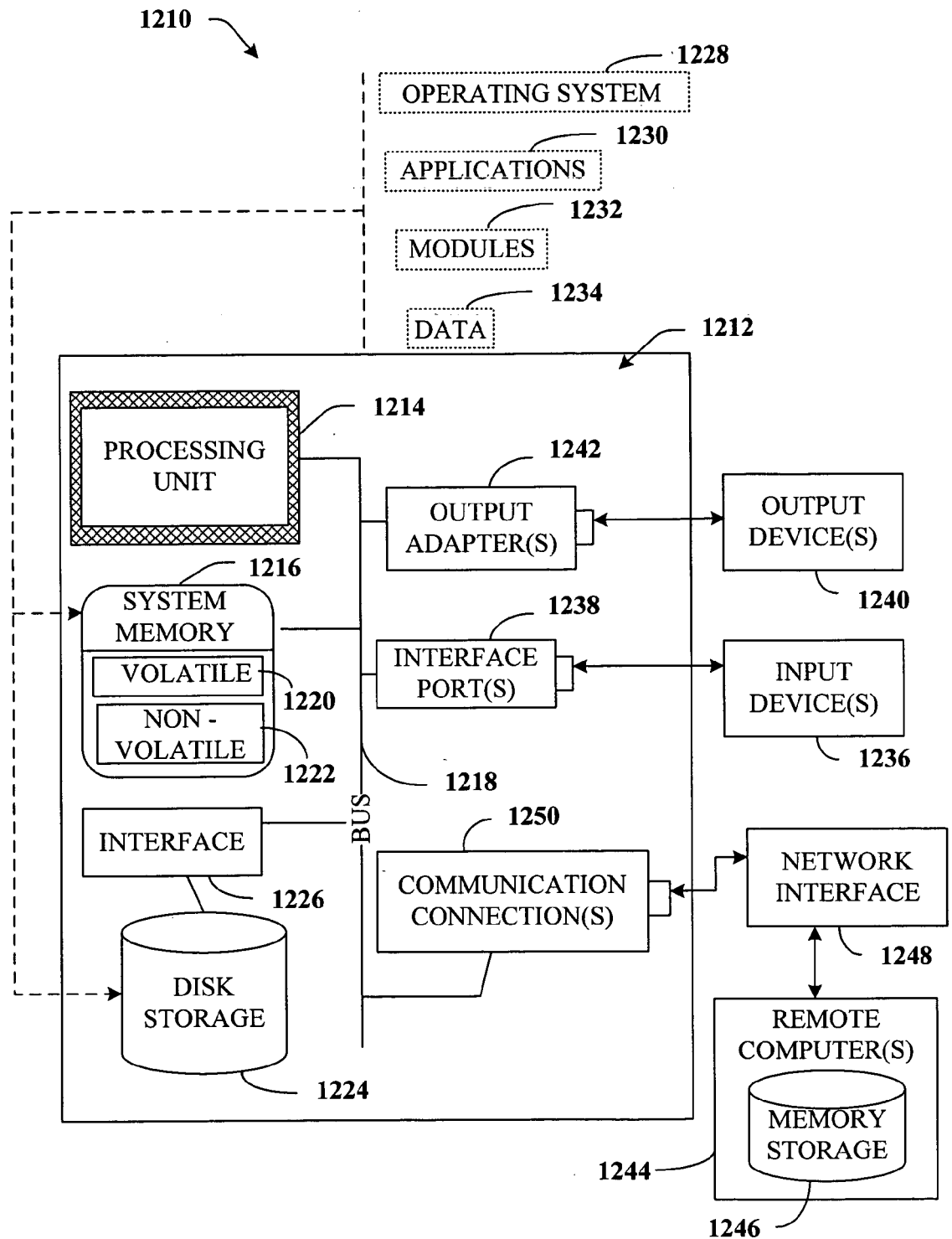
FIG. 12 illustrates an exemplary environment for implementing various aspects of the invention.

In order to provide additional context for various aspects of the subject invention, FIG. 12 and the following discussion are intended to provide a brief, general description of a suitable operating environment 1210 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus RAM (DRDRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A segmentation-based human interactive proof (HIP) generation system to ensure that a response is not generated by a computer by asking a user to complete a simple test which the computer is able to generate and grade, comprising:
   a first selection component to form a preliminary HIP sequence by randomly selecting multiple characters from a plurality of characters stored in a character cache.
   an arc generation module, a computer processor populates a thick arc cache with a plurality of thick arcs having a line thickness approximately equal to a line thickness of the multiple characters comprising the HIP sequence;
   and a second selection component to randomly select one or mores thick arcs from the thick arc cache for placement among the multiple characters of the HIP sequence such that each of the one or more thick arcs are free from intersection with the multiple characters of the HIP sequence.

2. The system of claim 1, wherein the second selection component randomly flips or rotates at least one of the one or more thick arcs prior to placing the one or more thick arcs among the multiple characters of the HIP sequence.

3. The system of claim 1, wherein the arc generation module further populates a thin arc cache with a plurality of thin arcs of a plurality of line thicknesses according to a predetermined maximum line thickness, the thin arcs intersect with one or more foreground pixels in the HIP sequence.

4. The system of claim 1, wherein the character cache stores multiple versions of each of the plurality of characters such that each of the multiple versions account for variances among x and y scaling, rotation, and font.

5. A segmentation-based human interactive proof (HIP) generation system, comprising:
   an HIP sequence comprising a plurality of characters;
   a thick non-intersecting arc cache comprising pre-rendered thick arcs having a line thickness approximately equivalent to a line thickness of the plurality of characters comprising the HIP sequence.
   a selection component of a computer processor, to randomly select one or more pre-rendered thick arcs for placement among the plurality of characters of the HIP sequence;
   an acceptance module to reject the randomly selected one or more pre-rendered thick arcs when a bounding box of the randomly selected one or more thick arcs intersects with at least one of the plurality of characters of the HIP sequence; and
   a warping component to warp the HIP sequence based at least upon a warp field selected from a warp field cache.

6. The system of claim 5, further comprising:
   a character cache to store a plurality of pre-rendered character images, the plurality of characters in the HIP sequence selected from among the pre-rendered character images stored in the character cache;
   a thin arc cache to store pre-rendered thin arcs having a line thickness less than the minimum line thickness of the thick arcs, the selection component to select one or more thin arcs from the thin arc cache for rendering among the plurality of characters of the HIP sequence, wherein at least one of the selected one or more thin arcs intersect with one or more foreground pixels of the HIP sequence when rendered among the plurality of characters of the HIP sequence; and
   a thick background arc cache to store one or more thick intersecting arcs that are randomly selected for rendering in the HIP sequence in a color identical to a background color of the HIP sequence, wherein the one or more thick intersecting arcs are rendered in the HIP sequence after the one or more thin arcs are rendered among the plurality of characters of the HIP sequence but before the warp field is applied.

7. The system of claim 5, wherein the thick non-intersecting arc cache further stores thick arcs having a length configured to facilitate generation of characters with long stroke lengths.

8. The system of claim 5, wherein the selection component places each thick arc based at least in part upon a usability map for a given character in the HIP sequence.

9. The system of claim 5, wherein the warping component warps the HIP sequence in at least one of globally or locally based upon a usability map for a given character.

10. The system of claim 5, further comprising a component to alter at least one of a rotation and curvature of one or more thick arcs selected from the thick arc cache before rendering the arc in the HIP sequence to facilitate minimizing cache size.

11. The system of claim 5, further comprising a usability map builder component to collect human user solutions to a plurality of HIP challenges to construct usability maps for at least a subset of characters found in the HIP challenges, the usability maps to indicate which portions of a character are more important for human recognition of the character.

12. The system of claim 5, further comprising at least one of a HIP cache that comprises a plurality of HIP signatures successfully solved by humans that are served to humans again; and a usability map cache that comprises a plurality of usability maps.

13. A segmentation-based human interactive proof (HIP) generation method, comprising:
    copying one or more characters from a character cache containing pre-rendered images of the one or more characters to place and on a HIP image;
    randomly generating by a computer processor, one or more arcs within a given line thickness range;
    selecting positions and orientations for each arc on the HIP image;
    computing an acceptability score for the placement of each arc on the existing image; and
    placing the arcs that are above the acceptability threshold on the HIP image.

14. The method of claim 13, further comprising storing one or more generated arcs to at least one cache based in part on a line thickness of the arcs.

15. The method of claim 13, wherein computing the acceptability score comprises at least one of the following:
    ascertaining whether a bounding box of the arc intersects with a bounding box of any character in the HIP sequence; and
    ascertaining whether the arc intersects with one or more foreground pixels present in the HIP sequence.

16. The method of claim 13, further comprising placing at least one of a thick non-intersecting arc and a thin intersecting arc in the HIP sequence based at least in part upon a usability map for any given character in the HIP sequence.

17. The method of claim 13, further comprising warping a HIP sequence in at least one of a global and local manner based at least in part upon at least one usability map for any given character in the HIP sequence.

18. The method of claim 13, further comprising building a plurality of usability maps to facilitate improved human recognition of characters in the HIP sequences, the building of the plurality of usability maps comprises:
    collecting human user solutions to a plurality of HIP sequences;
    analyzing successes and errors for each HIP sequence; and
    determining which character portions are at least one of more or less important for successful human recognition of the character.

19. The method of claim 18, further comprising storing the plurality of usability maps in a usability map cache.

\* \* \* \* \*

UNITED STATES PATENT AND TRADEMARK OFFICE
CERTIFICATE OF CORRECTION

PATENT NO. : 7,653,944 B2
APPLICATION NO. : 11/046996
DATED : January 26, 2010
INVENTOR(S) : Kumar H. Chellapilla et al.

It is certified that error appears in the above-identified patent and that said Letters Patent is hereby corrected as shown below:

In column 13, line 60, in Claim 1, delete "cache." and insert -- cache; --, therefor.

In column 13, line 66, in Claim 1, delete "mores" and insert -- more --, therefor.

In column 15, line 23, in Claim 13, after "place" delete "and".

Signed and Sealed this
Twenty-fifth Day of January, 2011

David J. Kappos
*Director of the United States Patent and Trademark Office*